W. R. ILES.
Check-Row Attachment for Corn-Planters.
No. 223,288. Patented Jan. 6, 1880.
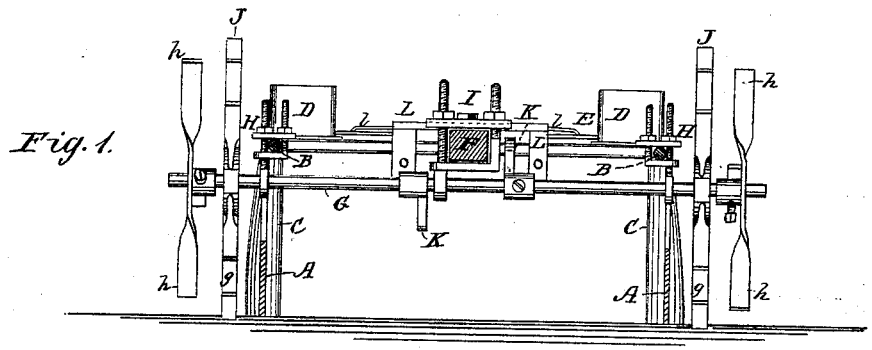
Fig. 1.
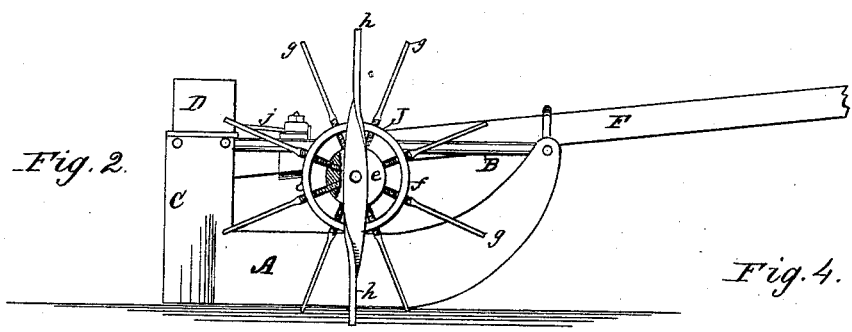
Fig. 2.
Fig. 4.
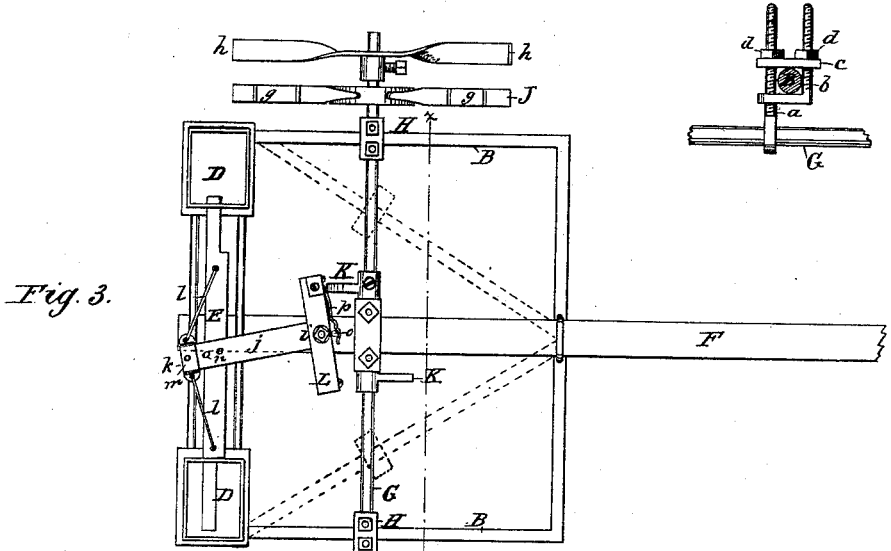
Fig. 3.
WITNESSES:
W. W. Hollingsworth
Edw. W. Byrn.
INVENTOR:
Wm. R. Iles
BY
ATTORNEYS.

UNITED STATES PATENT OFFICE.

WILLIAM R. ILES, OF FAIRMOUNT, ILLINOIS.

CHECK-ROW ATTACHMENT FOR CORN-PLANTERS.

SPECIFICATION forming part of Letters Patent No. 223,288, dated January 6, 1880.

Application filed March 4, 1879.

*To all whom it may concern:*

Be it known that I, WILLIAM R. ILES, of Fairmount, in the county of Vermillion and State of Illinois, have invented a new and Improved Check-Row Dropper and Marker Attachment for Corn-Planters; and I do hereby declare that the following is a full, clear, and exact description of the same, reference being had to the accompanying drawings, forming part of this specification, in which—

Figure 1 is a vertical section through the line $x\,x$ of Fig. 3, with the view taken from the front. Fig. 2 is a side elevation. Fig. 3 is a plan view. Fig. 4 is a detail of the devices for connecting the driving-axle with the frame.

My invention consists of an attachment to corn-planters for dropping and marking the corn in perfect check-row. The attachment has more especial adaptation to that form of corn-planter in which two thin blades or runners are arranged on each side of the tongue so as to rest upon and run on the ground, which runners or blades are connected to a suitable frame-work and terminate in the rear in vertical spouts extending from the seed-boxes, from which seed-boxes and down which spouts the corn is dropped by the reciprocation of a slide extending from one to the other of said boxes. My invention, though specially fitted for use in connection with such a planter, is also applicable to other forms of planters.

Its principal features consist of the particular means for imparting the motion of the drive-shaft to the feed-slide, the means for connecting the drive-shaft to the frame-work without alteration of or injury to the latter, and in the combined means for operating the feed-slide mechanism and marking the rows, as hereinafter more fully described.

In the drawings, A A represent two thin metal runner-blades arranged to rest edgewise upon the ground, and curved up in front to the frame-bars B. These blades terminate in the rear in vertical spouts C C, leading from seed-boxes D D, between which boxes is arranged a slide-bar, E, which is reciprocated to effect the dropping of the seed down the spouts. The frame B is provided with a tongue, F, which, together with the parts just described, constitutes the general features of the old form of planter, to which my devices are shown attached.

G is a transverse drive-shaft, which is made attachable to or detachable from the framework by the following means: A bolt, $a$, Fig. 4, is provided with an eye, which forms a bearing for said shaft and has its stem or shank screw-threaded. A second screw-threaded bolt, $b$, is bent at right angles, and has a screw-threaded perforation tapped in its bent end of a size adapted to fit over the thread of the bolt $a$. When $b$ is thus screwed upon $a$ their two screw-threaded ends project upwardly in parallel position. Between these projecting ends the side bars, B, of the frame B are placed and inclosed by a perforated yoke-plate, $c$, which is clamped upon the bars B by nuts $d$. One of these clamping devices serves to connect each end of the axle or shaft G to the corresponding side bar of the frame, as at H H, Figs. 1 and 3, and a larger one serves to connect the shaft to the tongue, as at I. These parts $a\,b\,c$ constitute a universal connection, and their application and value are as follows: In the first place, they serve to connect the axle and frame without any alteration or adaptation of the frame, or even so little a change as the boring of a hole. By screwing the part $b$ up or down on $a$, also any variation in the vertical adjustment may be obtained which is required, while the swiveling of $b$ around $a$ permits the shaft to be attached to any part of the frame, whether it be to one of the right-angular side bars, B, as shown, or a diagonal brace, as shown in dotted lines in Fig. 3.

For giving motion to this shaft G wheels J J are arranged rigidly upon the ends of said shaft outside of the runners. These wheels consist of hubs having a solid center, $e$, and a flange, $f$, from which project a series of radial spokes or spikes, $g$, which penetrate the ground and give a certain and positive revolution to the shaft, without that danger of slipping which exists when the periphery of a wheel runs upon the surface. These spikes are secured by being screwed into the solid center $e$, and are firmly held and braced by the flange $f$.

For marking the field in check-rows, I fix upon the shaft, outside of the spiked wheels, two (more or less) radial spikes or arms, $h$, which revolve with the shaft and wheel and mark the row with a plain and ineffaceable indentation. Respecting this feature of my invention, I would state that I am aware that shoes or cross-bars on the periphery of a wheel have been used for marking the row; but by reason of the rough surface of the field the marks made thereby are likely to be covered up by the falling in of clods. The action of my marker obviates this difficulty, for as it rotates it enters the ground at a forward inclination, and then as the planter advances the swinging forward of the upper portion of the marker-arm causes the portion of the marker which is in the earth to push the clods laterally out of the way, after which the arm is withdrawn by the continuance of the revolution, leaving a deep impression in the earth which is wedge-shaped and widest at the top. This form of marker, which, it will be seen, has straight sides and a chisel-point without an enlargement at the end, has also a special coaction with the spiked wheel, in that said marker sinks readily into the ground and allows the spikes of the wheel to always enter and take hold of the earth, instead of lifting the wheel more or less out of the ground and giving an irregular motion, as a shoe or enlarged marking-surface would every time it touched the earth.

For increasing or diminishing the distance between the rows, the circumference of the driving-wheels is enlarged or diminished by screwing the spikes $g$ in or out, as the case may be, a corresponding change in the vertical adjustment of the frame being made through the connection $a\ b\ c$.

For transmitting the motion of the drive-shaft to the feed-slide, two cams or tappets, K K, are arranged upon said shaft, one on each side of the tongue, and a rectangular frame, L, is made to embrace the tongue just in the rear of the said shaft, and in position to be alternately struck by the cams. This frame L is pivoted centrally to the tongue at $i$, and has an arm, $j$, extending to the rear. Said arm enters a socket, $k$, which latter is connected to the feed-slide by rods $l\ l$. Now, as the shaft revolves it will be seen that the cams K alternately strike the frame L, and this is oscillated so as to impart reciprocating motion to the slide.

For increasing or diminishing the throw of said feed-slide the socket $k$ is adjusted farther up or lower down on the arm $j$ by means of the set-screw $m$ and holes $n$.

To prevent any rebound of the feed-slide when it reaches the end of its strokes, (which would open the feed-orifices again,) I place in front of the frame L, on the tongue, a pin, $o$, and upon said frame I fix a spring, $p$, corrugated to form two seats, so that when the frame L and feed-slide are moved to their limit in one direction one of these seats in the spring catches over the pin and holds the parts to their position until the driving mechanism shifts the position of the frame L, when the other seat in the spring acts in a similar manner for the alternate movement.

The seed, it will be understood, have to be dropped in line with the impression made by the markers, and, as the markers are in front of the seed-boxes, it will be understood that the cams are so timed in relation to the markers that they cause the feed-slide to act, not at the same time that the marker makes its impression, but a little later, or just when the impression made by the marker reaches the line of the seed-boxes.

In fixing the position of the markers on the shaft, they are arranged outside of the seed-boxes a distance just half the distance between the rows, and this for the return row causes the markers on the inside to register with and enter the marked impression of the previous row.

From the foregoing description it will be seen that any form of planter of the kind described may be supplied with an accurate check-row dropper and marker without any special adaptation or alteration of its parts.

With respect to the means for driving the seed-slides, I do not claim, broadly, the driving-shaft having actuating-cams as combined with the seed-slide through an elbow-lever connection, but only the combination of such shaft and cams with the peculiarly-constructed rectangular frame L, whose rectangular character permits it to embrace the tongue and be connected thereto by a long bearing, and, while giving a broad face to the sweep of the cams, is also very strong and durable and well adapted to resist the wear of these active parts.

Having thus described my invention, what I claim as new is—

1. The screw-threaded bolt $a$, having a perforation or bearing for the shaft, the screw-threaded bolt $b$, bent at right angles and tapped to screw on bolt $a$, together with the yoke-plate $c$ and nuts for holding the same, all combined with each other and with the bars B and shaft G for connecting the two latter, as described.

2. The rectangular frame L, pivoted to and embracing the tongue, and having an arm, $j$, connected with the feed-slide, in combination with said tongue and feed-slides, and the shaft G, having cams K K, substantially as and for the purpose described.

3. The combination, with the frame L and the pin $o$, of the spring $p$, attached to the frame L and corrugated, substantially as and for the purpose described.

4. The combination of the shaft G for operating upon the feed-slide, the spiked wheels J for rotating said shaft, and the straight radial arms $h$, made without enlargement at their ends and fixed upon the shaft beside said wheels, substantially as and for the purpose described.

The above specification of my invention signed by me this 21st day of February, 1879.

WILLIAM R. ILES.

Witnesses:
EDW. W. BYRN,
SOLON C. KEMON.